Dec. 4, 1945.  V. WALKER  2,390,404

METHOD FOR MANUFACTURING OPTICAL LENSES AND THE LIKE

Filed April 7, 1943

INVENTOR
VICTOR WALKER
BY
Bean, Brooks, Buckley & Bean.
ATTORNEYS

Patented Dec. 4, 1945

2,390,404

UNITED STATES PATENT OFFICE 2,390,404

METHOD FOR MANUFACTURING OPTICAL LENSES AND THE LIKE

Victor Walker, Fort Erie, Ontario, Canada, assignor to AlnCin, Inc., Buffalo, N. Y.

Application April 7, 1943, Serial No. 482,173

1 Claim. (Cl. 41—42)

This invention relates to methods and means for processing glass, as in connection with the manufacture of glass lenses and other optical devices and whenever it is required to dress glass stock pieces accurately to prescribed contours thereof and to provide polished surfaces thereon of optically precise regularity.

As disclosed in my U. S. Patents Nos. 2,213,023; 2,238,008; 2,275,602, and in my pending patent applications Serial Nos. 442,198 and 460,397, I have determined that suitable chemical reagents may be employed to treat the surfaces of mechanically pre-shaped glass stock pieces to simultaneously clarify them and to reduce them to prescribed form and dimensions. My previous work has also referred to combination type manufacturing processes; that is, processes involving alternate mechanical abrading and chemical treatments of glass stock culminating in production of a cleared finished surface having high light transmissive characteristics.

In my earlier patents and patent applications aforesaid I disclosed the use of chemical baths of only substantially constant reagent characteristics, but I have now determined that the characteristics of such baths may be varied throughout a single manufacturing process, with great benefit for some purposes, and at different stages of the chemical reagent treatments of the stock pieces. By reason of such variation of the chemical reagent characteristics, in specifically controlled manner, still further improvements in the qualities of the articles produced and still further economies with respect to the time and costs of processing, are provided. It is therefore an object of the present invention to provide an improved technique with respect to control and application of chemical reagent actions upon glass stock pieces whereby improved optical type articles may be produced in conjunction with improved economies in the manufacturing operation. Another object of the invention is to provide an improved controlled variation of the reagent characteristics to which the glass stock is subjected throughout a single manufacturing operation, whereby the chemical treating step of the manufacturing method converts from an initial stock consuming and clearing action to a final stock clearing and polishing action. Other objects and advantages of the invention will appear from the specification hereinafter.

Figure 1:
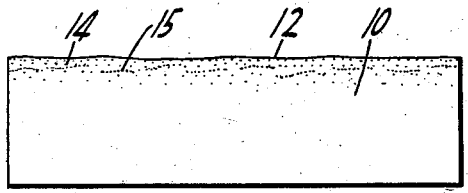
Fig. 1 is a fragmentary section, on a greatly magnified scale, of a glass stock piece prior to being processed in accord with the method of the invention.

The invention is illustrated by means of the drawing as being performed in connection with the fabrication of an optical device from a glass stock piece 10. It will be understood, of course, that although the stock piece of Fig. 1 appears to be in the nature of a flat object, application of the invention is not so limited, and the surface of the stock piece may in lieu thereof be rounded or formed with any desired type or curving profile. In fact, the figures of the drawing are intended to represent a fragment of a stock piece constituting a greatly magnified increment of either a curved surface lens or a flat surfaced prism, or the like. In any event the stock piece will include a surface portion 12 which is generally shaped in the manner intended for the corresponding surface portion of the finished article. Thus, it will be understood that the surface portion 12 of the stock piece may have been previously formed by any suitable molding or grinding or cutting or other shaping process, or the like.

The manufacturing method of the present invention contemplates as a possible preliminary step thereof reduction of the initial surface portion 12 of the stock piece so as to simultaneously eliminate undesirable surface material therefrom and to accurately shape the profile thereof to approximately match the profile prescribed for the finished article. For example, if the stock piece 10 had been initially molded into the general form of Fig. 1 the surface portion 12 thereof will likely be found to contain impurities and inclusions of foreign substances as indicated at 14 such as are absorbed from contact with the heated metallic mold used to initially shape the stock piece. Also, upon initial preparation of the stock piece 10, the surface portion thereof will likely assume a fractured and stressed condition as indicated at 15. Therefore, if the article to be produced is designed to be of optimum light transmissive characteristics and for use as an optical device, it will be desirable to first remove the surface layer containing the imperfections referred to. Also, such initial molding or other shaping processes are usually productive of only crudely shaped surfaces, and it may therefore be required to subsequently shape the stock piece more accurately to match the prescribed profile form thereof.

Hence, the stock piece such as of Fig. 1 will usually require a mechanical dressing or abrading process to be applied thereto so as to simultaneously cut away the imperfect surface material thereof and to shape the stock piece to more accurately conform to the final prescribed profile thereof. Such reduction shaping may be accomplished by a grinding process; such as by means of a grinding lap employing a suitable grade of loose abrasive, or by means of a rotating bonded abrasive tool, or the like. In any case the mechanical abrasion process will cut away the top layer of the stock piece to expose a new surface as designated at 16 in Fig. 2; the profile of which will be in substantial conformity with the profile prescribed for the finished article. It will be understood that a lap mechanical abrasion process might be applied to the stock piece of Fig. 1 by means of a lap or tool shaped complementary to the profile prescribed for the finished article, and that if a lap is used for this purpose it will be arranged to simultaneously rotate and oscillate relative to the stock piece in accord with well known optical manufacturing principles.

The abrasion reduction process referred to hereinabove will be preferably retarded and stopped short of the prescribed level of finish for the article to be produced, because whenever a grinding or abrasion process is applied to glass it is inevitable that the glass body will thereby become fractured to at least some degree interiorly thereof, as illustrated at 18 on a magnified scale in Fig. 2. Also, the outer surface portion 16 of the abraded stock piece will be found to comprise a mass of minute crevices in which are impounded minute glass fragments and other debris of the abrading operation, as indicated at 20.

Figure 2:
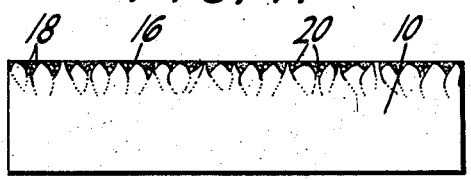
Fig. 2 is a view corresponding to Fig. 1 subsequent to application thereon of a mechanical abrading and shaping process.

In accord with prior methods of optical manufacture, the stock piece of Fig. 2 would thereupon be subjected to a long series of successively finer abrading operations, whereby the fracturing and gouging effects of each preceding coarser grinding operation would be removed but replaced by similar series of gouges and fractures of reduced dimensions. Thus, in theory, the successively finer grinding operations would be carried on to terminate in rouge polishing processes designed to provide a finished article from which successive layers of fractured stock have been removed until only a rouge-rubbed and polished surface remains. Such methods are tremendously costly from the standpoint of time and expense, and require employment of the most skillful type of optical workers, and such processes produce finished articles which are actually of inferior optical characteristics. This inferiority is due to the fact that the successive rubbing and mechanical polishing actions imposed upon the stock pieces cause the surface layers of the glass to flow. This results in covering over of minute crevices in the initial surfaces and in the production of stresses in the subsurface layers of the stock pieces, while a typically "rubbed" and superficially glossy type polish is produced at the outer surface thereof. Hence, the finished articles will appear to the eye to be highly polished, and this result is due largely to the highly specular reflective characteristics of the surfaces so produced. However, scientific tests of such articles will invariably confirm the fact that the sub-surface portions thereof are of inferior light transmissive characteristics, and that lenses or other optical devices of this nature are undesirable because of their susceptibility to weathering processes which tend to open the rubbed-over crevices referred to and thus to spoil the article.

The method of the present invention avoids the disadvantages and objections referred to hereinabove in that subsequent to application of a mechanical shaping operation as illustrated for example by Fig. 2, the stock piece is subjected to a surface clearing step which removes from the stock piece surface the impurities and debris impounded therein. The initial surface clearing process may be effectively practiced, as explained in my prior patents and patent application referred to hereinabove, through use of a suitable mixture of acids. Thus, for example, when working with stock pieces of typical soda-lime-glass content a suitable acid bath will comprise a mixture of approximately five parts by weight of sulphuric acid and one part by weight of hydrofluoric acid in water; although good results may be obtained for the purposes of the invention when using mixtures as low as two parts by weight of sulphuric acid to one part of hydrofluoric acid. The acids referred to are the commercially concentrated forms thereof, such as are readily available from industrial chemical supply concerns. As explained in my earlier disclosures the object of the initial treating of the mechanically shaped surface of the stock piece is to clear away therefrom any fractured glass and debris particles adhering thereto and impounded within the surface and sub-surface portion of the stock piece; and this clearing operation may be effected by simply immersing the ground glass stock piece in the bath referred to hereinabove. The length of time for such immersion will depend entirely upon conditions and may be readily determined by visual inspections of the stock piece as the process continues.

It appears that the hydrofluoric acid content of the bath attacks the glass substance of the stock piece, and more particularly the most susceptible portions thereof which in any case are the smaller fragments such as comprise the fractured and impounded surface layer portion. The reaction between the hydrofluoric acid and the glass substance produces by-products comprising fluorides of the metallic contents of the glass; and these fluorides are of such nature as to tend to adhere to the glassware. Thus, the fluorides would normally tend to coat the glassware with a frosty appearing substance, such as is well known and commonly referred to as the frosting upon etched glass. However, the sulphuric acid ingredients of the bath used in accord with the present invention react immediately with these fluorides as they tend to form. The products of this secondary reaction are the corresponding sulfate salts, and the sulfate salts do not tend to so closely adhere to the glassware. Consequently, they may be removed from the glass as required by simple mechanical motions, such as wiping or flushing, or the like.

Consequently, if the sulfate salts so produced are removed from the glassware as required to prevent deep covering thereof as the chemical reactions progress, there will be no detrimental accumulations of resist materials, such as would otherwise unequally retard the acid attack upon the stock piece with the result that an unequal reduction of the stock piece at different portions thereof would take place to spoil the glassware for the purpose intended.

I have determined, however, that in order to obtain maximum clearing and polishing type results when using acid baths such as are referred to in this and my earlier patent application and patents, the characteristics of the chemical bathing treatment must be varied during each stock piece treating process and regulated in accord with a new principle of control. This is required in view of the changing nature of the stock piece surface being processed throughout the range of the chemical treating steps of the invention from the initially abraded form of the stock piece to its finely finished form; and the controlled variation referred to is also desirable in view of the fact that the chemical reactions of the process must be brisk in the early stages of the operation and subdued in the latter stages in order to effect simultaneously maximum operating economies and finished articles of optimum clarity and surface polished form. For example, when the abraded stock piece of Fig. 2 is first subjected to the acid bath treatment, the stock piece surface 16 comprises a vast conglomeration of minutely divided glass and debris particles such as are readily permeable by the acid solutions and susceptible to attack thereby from all sides. Consequently, the reaction between the hydrofluoric acid ingredient of the bath and the substances of the stock piece surface will take place at a relatively great rate; and I have found that under such conditions it is essential to provide in the acid bath a great preponderance of sulphuric acid of relatively concentrated form so as to enable the sulphuric acid ingredient to match the avid action of the hydrofluoric acid and to convert the fluoride salts into sulfate salts as rapidly as they tend to form. This type of action by the sulphuric acid ingredient may be obtained by employing an acid mixture of the characteristics referred to hereinabove; but I have also determined that a strong sulphuric acid bath of this type when acting upon a surface which has been almost cleared by earlier operations as referred to hereinabove will induce production of an optically impaired glass surface. It seems that the action of the sulphuric acid referred to results in too violent a disruptive action upon the relatively thin fluoride-sulfate coating of a practically finished work piece such as to develop thereon minute pits and "greasy" effects and irregular patch shaped patterns in the salt coverings of the stock piece between wiping operations. Hence, under such conditions the acid bath would proceed to provide a minutely uneven attack upon the stock piece and production of a finished glass surface having a somewhat shiny but reduced transparency appearance such as would be provided by a film of grease on the stock piece and minutely scarred and unpolished effects so as to be unsuited in the best sense to certain exacting optical purposes.

The present invention contemplates, therefore, controlled variation of the characteristics of the sulphuric acid ingredient of the treating bath, whereby whenever the bath is being applied to a freshly abraded glass surface the sulphuric acid ingredient of the bath will be of such strength as to be adapted to match the correspondingly accelerated production of fluorides due to the action of the hydrofluoric acid ingredient of the bath on the readily permeable fractured surface mass; but whereby during the final stages of the processing operation the sulphuric acid ingredient of the bath will be of reduced strength so as to still match the reduced rate of production of fluorides while being retarded against damaging of the finished surface of the glassware and for producing thereon a polished type final surface.

This result may be accomplished by gradually reducing in controlled manner, the sulphuric acid action of the bath. This may be accomplished by adding water or any other suitable modifying agent to the bath, as the glass surface processing operation progresses. For example, commencing with an acid mixture as specified hereinabove, I have discovered that good results may be obtained when processing ordinary soda-lime glass lens blanks or the like by dipping the glass stock pieces into the concentrated acid bath for periods from four to ten seconds, or until such time as complete coverings of sulfate salts are seen to blanket the stock pieces. The stock pieces are then removed from the bath and the blankets of salts eliminated therefrom by simple wiping or washing operations, or the like. The stock pieces are thereupon returned to the acid bath for similar or slightly longer periods; and the processes of alternately cleaning away the sulfates and re-dipping the stock pieces are repeated until such time as the stock pieces are seen to have been reduced to the desired finished form.

As explained hereinabove, as the acid clearing process progresses, the layer of fractured and impounded glass particles at the original surface of the ground stock piece will become gradually eliminated, as through the stage illustrated by Fig. 3 of the drawing. This figure of the drawing illustrates the reduced amount of powdered glass particles which are available to the acid action at this stage of the process, whereby the rate of production of fluorides will now be of reduced order. In accord with the principles of the present invention, at this or any other suitable intermediate stage of the acid treating process, I reduce the sulphuric acid action of the bath; and a practical method for accomplishing this is to add water to the bath. It will be understood that the bath may be contained either in a tub, for batch production purposes, or it may be provided in the form of a running stream conducted through a launder or the like containing the glassware to be treated. In any case, in accord with the method of the present invention provision will be made for modifying the sulphuric acid action as the chemical processing is carried out; and this reduction may be either intermittently or continuously effected throughout the process, and will be so regulated that as the stock piece approaches the final finished form thereof only a mild polishing acid reaction will be permitted thereagainst. For example, the acid bath may contain beneficially as much as one to three parts by weight of water to ten parts by weight of sulphuric acid at this final stage of the operation; and the exact preferred proportion of water to acid will depend upon the chemical composition of the glass stock and the type of finish desired. I have discovered that control of the acid process as explained hereinabove will produce a much smoother and more regular surface on the glassware, and a finish that may be properly described as "polished" as distinguished from the "cleared" but duller surface finishes produced by the processes of my earlier patent disclosures referred to. Also, it will be understood that this improved quality of product will be thereby obtained in conjunction with maximum efficiency of the manufacturing operation because during the earlier stages of the chemical treating process the rate of stock piece reduction will be relatively great and substantial savings of time and expense are thereby provided.

Figure 3:
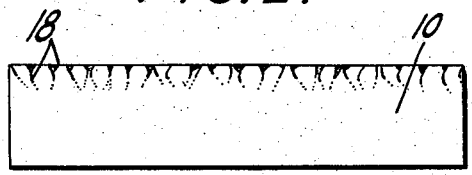
Fig. 3 is a view corresponding to Figs. 1 and 2 subsequent to initial action thereon of the chemical treating step of the method of the invention.
Figure 4:
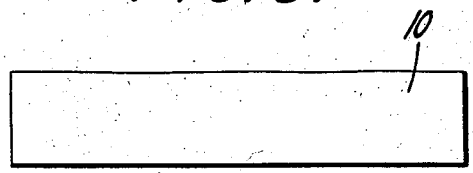
Fig. 4 is a view corresponding to Fig. 3, but showing the stock piece at the end of the chemical treating step thereof.
Figure 5:
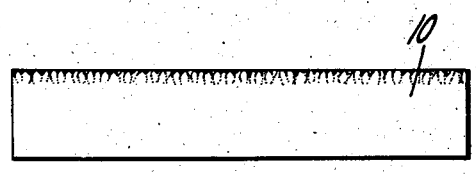
Fig. 5 is a corresponding view of the stock piece subsequent to application thereto of an optional further mechanical abrading and leveling step of the method of the invention.
Figure 6:
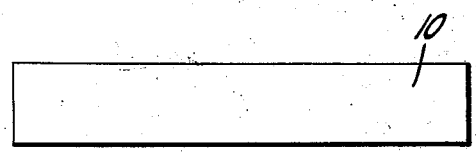
Fig. 6 is a corresponding view of the stock piece subsequent to application thereto of a final chemical treating step.

Thus, it is possible that the work piece of Figs. 1-3 may be reduced by the controlled acid bath treatment of the invention to the finished and polished form illustrated by Fig. 4. Or, it may be preferred to conduct the chemical reduction process in the form of a series of coordinated operations with mechanical levelling steps alternated therebetween. For example, a single chemical treating process as described hereinabove when applied to a relatively coarsely ground stock piece may be productive of a finished surface which is of slightly undulant profile, due to the coarseness of the cusps of solid glass produced by the preliminary grinding operation. In such case the stock piece may be subjected to another relatively fine grinding process subsequent to the chemical treatment described hereinabove, whereby the surface thereof will be further mechanically reduced toward accurate conformity with the prescribed profile form and dimensional level of the finished article. Fig. 5 illustrates the stock piece as it might appear subsequent to the application thereon of a secondary fine grinding operation as referred to. The stock piece of Fig. 5 will thereupon be subjected to a secondary chemical treating process of the nature described hereinabove in connection with processing of the stock piece through the stages of Figs. 2—3—4 and it will be understood that the stock piece will thereupon emerge with a surface more accurately conforming to the prescribed profile form thereof; and that such alternate grinding and acid treating processes may be employed in any desired number of combinations as may be preferred to produce a finished article of any desired degree of profile accuracy and highly polished form.

It will be understood that the chemical contents of the acid treating bath may perhaps be beneficially altered in order to accommodate the chemical reducing and clearing and polishing action to special types of glass stock. For example, as the lead or barium or other metallic contents of the glass stock might be varied to obtain different refractive or other optical characteristics, the acid bath may perhaps be fortified with nitric acid or phosphoric acid, or the like, according to the individual case. Similarly, it is of course possible that the sulphuric acid ingredient of the bath may be reduced for the purposes of the present invention by addition of a modifying agent other than water; and that in any case the object is to provide a stock reactive chemical solution which in the first instance consumes the glass stock at relatively rapid rate while uniformly reducing the level thereof, and which is modified with respect to the sulphuric acid action thereof toward the latter stages of the operation to be converted into primarily a glass polishing process.

It will be understood that although only a few applications of the present invention have been specifically described and referred to, the invention is not so limited and it may be employed to a large variety of uses, and that various changes may be made with respect to the specific mode of operation described hereinabove without departing from the spirit of the invention and the scope of the appended claim.

I claim:

The method of providing a lens or the like, comprising mechanically abrading a glass stock piece at a surface portion thereof, reducing and clearing said abraded surface portion thereof by reaction of the abraded glass structure thereof with a first mixture of hydrofluoric acid and concentrated sulphuric acid and water, then mechanically displacing the acid reaction residue from said surface, and then further clearing and polishing said surface portion with a second mixture of hydrofluoric acid and sulphuric acid wherein the sulphuric acid ingredient thereof is substantially diluted relative to the concentration form of sulphuric acid in said first mixture.

VICTOR WALKER.